United States Patent
York et al.

(10) Patent No.: US 8,171,650 B2
(45) Date of Patent: May 8, 2012

(54) INTELLIGENT REPEATABLE ARM MOUNTING SYSTEM

(75) Inventors: Frederick York, Longwood, FL (US); Brent Bailey, Winter Springs, FL (US); Clark H. Briggs, DeLand, FL (US); David M. Danielson, Sorrento, FL (US); Keith G. Macfarlane, Lake Mary, FL (US); Herbert G. Seegers, Eustis, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/009,965

(22) Filed: Jan. 20, 2011

(65) Prior Publication Data
US 2011/0173828 A1 Jul. 21, 2011

Related U.S. Application Data

(60) Provisional application No. 61/296,555, filed on Jan. 20, 2010.

(51) Int. Cl.
*G01B 5/004* (2006.01)
(52) U.S. Cl. .......................................... 33/503
(58) Field of Classification Search .................... 33/503, 33/534, 556, 559, 1 PT, 1 N
See application file for complete search history.

(56) References Cited

U.S. PATENT DOCUMENTS

| | | |
|---|---|---|
| 1,918,813 A | 2/1932 | Kinzy |
| 3,458,167 A | 7/1969 | Cooley, Jr. |
| 4,537,233 A | 8/1985 | Vroonland et al. |
| 4,663,852 A | 5/1987 | Guarini |
| 4,664,588 A | 5/1987 | Newell et al. |
| 4,954,952 A | 9/1990 | Ubhayakar et al. |
| 5,189,797 A | 3/1993 | Granger |
| 5,219,423 A | 6/1993 | Kamaya |
| 5,289,264 A | 2/1994 | Steinbichler |
| 5,402,582 A | 4/1995 | Raab |
| 5,510,977 A | 4/1996 | Raab |

(Continued)

FOREIGN PATENT DOCUMENTS
DE 4410775 A1 10/1995
(Continued)

OTHER PUBLICATIONS

Information on Electro-Optical Information Systems; EOIS 3D Mini-Moire C.M.M. Sensor for Non-Contact Measuring & Surface Mapping; Direct Dimensions, Jun. 1995.

(Continued)

*Primary Examiner* — Yaritza Guadalupe-McCall
(74) *Attorney, Agent, or Firm* — Cantor Colburn LLP

(57) ABSTRACT

Exemplary embodiments include a portable articulated arm coordinate measuring machine including a manually positionable articulated arm portion having opposed first and second ends, the arm portion including a plurality of connected arm segments, each of the arm segments including at least one position transducer for producing position signals, a measurement device attached to the first end of the articulated arm coordinate measuring machine, an electronic circuit for receiving the position signals from the transducers and for providing data corresponding to a position of the measurement device, a base coupled to the second end, an upper mount portion disposed on the base, a lower mount portion fixed to a mounting structure and configured to repeatably connect to the upper mount portion and an electronic identification system configured to send identifier information identifying the lower mount portion to the electronic circuit.

47 Claims, 12 Drawing Sheets

U.S. PATENT DOCUMENTS

| | | | |
|---|---|---|---|
| 5,528,505 A | 6/1996 | Granger et al. | |
| 5,535,524 A | 7/1996 | Carrier et al. | |
| 5,752,112 A | 5/1998 | Paddock et al. | |
| 5,754,449 A | 5/1998 | Hoshal et al. | |
| 5,768,792 A | 6/1998 | Raab | |
| 5,829,148 A | 11/1998 | Eaton | |
| 5,832,416 A | 11/1998 | Anderson | |
| 5,926,782 A | 7/1999 | Raab | |
| 5,956,857 A | 9/1999 | Raab | |
| 5,978,748 A | 11/1999 | Raab | |
| 5,983,936 A | 11/1999 | Schwieterman et al. | |
| D423,534 S | 4/2000 | Raab et al. | |
| 6,067,116 A | 5/2000 | Yamano et al. | |
| 6,131,299 A | 10/2000 | Raab et al. | |
| 6,151,789 A | 11/2000 | Raab et al. | |
| 6,166,504 A | 12/2000 | Iida et al. | |
| 6,166,811 A | 12/2000 | Long et al. | |
| RE42,055 E | 1/2001 | Raab et al. | |
| 6,219,928 B1 | 4/2001 | Raab et al. | |
| D441,632 S | 5/2001 | Raab et al. | |
| 6,253,458 B1 | 7/2001 | Raab et al. | |
| 6,282,195 B1 | 8/2001 | Miller et al. | |
| 6,366,831 B1 | 4/2002 | Raab | |
| 6,418,774 B1 | 7/2002 | Brogaardh et al. | |
| 6,438,856 B1 | 8/2002 | Kaczynski | |
| 6,519,860 B1 | 2/2003 | Bieg et al. | |
| D472,824 S | 4/2003 | Raab et al. | |
| 6,598,306 B2 | 7/2003 | Eaton | |
| 6,611,346 B2 | 8/2003 | Granger | |
| 6,611,617 B1 | 8/2003 | Crampton | |
| 6,612,044 B2 | 9/2003 | Raab et al. | |
| 6,668,466 B1 | 12/2003 | Bieg et al. | |
| D491,210 S | 6/2004 | Raab et al. | |
| 6,789,327 B2 | 9/2004 | Roth et al. | |
| 6,868,359 B2 | 3/2005 | Raab | |
| 6,879,933 B2 | 4/2005 | Steffey et al. | |
| 6,892,465 B2 | 5/2005 | Raab et al. | |
| 6,920,697 B2 | 7/2005 | Raab et al. | |
| 6,931,745 B2 | 8/2005 | Granger | |
| 7,006,084 B1 | 2/2006 | Buss et al. | |
| 7,024,032 B2 | 4/2006 | Kidd et al. | |
| 7,152,456 B2 | 12/2006 | Eaton | |
| 7,184,047 B1 | 2/2007 | Crampton | |
| 7,191,541 B1 | 3/2007 | Weekers et al. | |
| 7,249,421 B2 | 7/2007 | MacManus et al. | |
| 7,296,979 B2 | 11/2007 | Raab et al. | |
| 7,313,264 B2 | 12/2007 | Crampton | |
| 7,383,638 B2 | 6/2008 | Granger | |
| 7,395,606 B2 | 7/2008 | Crampton | |
| 7,525,276 B2 | 4/2009 | Eaton | |
| 7,545,517 B2 | 6/2009 | Rueb et al. | |
| 7,546,689 B2 | 6/2009 | Ferrari et al. | |
| D599,226 S | 9/2009 | Gerent et al. | |
| 7,591,077 B2 | 9/2009 | Pettersson | |
| 7,591,078 B2 | 9/2009 | Crampton | |
| 7,604,207 B2 | 10/2009 | Hasloecher et al. | |
| 7,614,157 B2 * | 11/2009 | Granger | 33/503 |
| 7,624,510 B2 | 12/2009 | Ferrari | |
| D607,350 S | 1/2010 | Cooduvalli et al. | |
| 7,693,325 B2 | 4/2010 | Pulla et al. | |
| 7,712,224 B2 | 5/2010 | Hicks | |
| 7,735,234 B2 | 6/2010 | Briggs et al. | |
| 7,743,524 B2 | 6/2010 | Eaton et al. | |
| 7,752,003 B2 | 7/2010 | MacManus | |
| 7,765,707 B2 | 8/2010 | Tomelleri | |
| 7,779,548 B2 | 8/2010 | Ferrari | |
| 7,779,553 B2 | 8/2010 | Jordil et al. | |
| 7,804,602 B2 | 9/2010 | Raab | |
| 7,805,851 B2 | 10/2010 | Pettersson | |
| 7,805,854 B2 | 10/2010 | Eaton | |
| RE42,082 E * | 2/2011 | Raab et al. | 33/503 |
| 7,881,896 B2 | 2/2011 | Atwell et al. | |
| 2001/0004269 A1 | 6/2001 | Shibata et al. | |
| 2002/0032541 A1 | 3/2002 | Raab et al. | |
| 2003/0053037 A1 | 3/2003 | Blaesing-Bangert et al. | |
| 2003/0208919 A1 | 11/2003 | Raab et al. | |
| 2004/0162700 A1 | 8/2004 | Rosenberg et al. | |
| 2004/0259533 A1 | 12/2004 | Nixon et al. | |
| 2005/0085940 A1 | 4/2005 | Griggs et al. | |
| 2005/0259271 A1 | 11/2005 | Christoph | |
| 2005/0283989 A1 | 12/2005 | Pettersson | |
| 2006/0026851 A1 * | 2/2006 | Raab et al. | 33/503 |
| 2006/0028203 A1 | 2/2006 | Kawashima et al. | |
| 2006/0053647 A1 * | 3/2006 | Raab et al. | 33/503 |
| 2006/0096108 A1 * | 5/2006 | Raab et al. | 33/503 |
| 2006/0123649 A1 | 6/2006 | Muller | |
| 2006/0169050 A1 | 8/2006 | Kobayashi et al. | |
| 2006/0291970 A1 | 12/2006 | Granger | |
| 2007/0043526 A1 | 2/2007 | De Jonge et al. | |
| 2007/0058162 A1 | 3/2007 | Granger | |
| 2007/0097382 A1 | 5/2007 | Granger | |
| 2007/0105238 A1 | 5/2007 | Mandl et al. | |
| 2007/0142970 A1 | 6/2007 | Burbank et al. | |
| 2007/0177016 A1 | 8/2007 | Wu | |
| 2008/0052936 A1 | 3/2008 | Briggs et al. | |
| 2008/0148585 A1 * | 6/2008 | Raab et al. | 33/503 |
| 2008/0196260 A1 | 8/2008 | Petterson | |
| 2008/0204699 A1 | 8/2008 | Benz et al. | |
| 2008/0235969 A1 | 10/2008 | Jordil et al. | |
| 2008/0235970 A1 | 10/2008 | Crampton | |
| 2008/0252671 A1 | 10/2008 | Cannell et al. | |
| 2008/0256814 A1 | 10/2008 | Pettersson | |
| 2008/0257023 A1 | 10/2008 | Jordil et al. | |
| 2008/0271332 A1 | 11/2008 | Jordil et al. | |
| 2008/0282564 A1 | 11/2008 | Pettersson | |
| 2009/0000136 A1 | 1/2009 | Crampton | |
| 2009/0031575 A1 | 2/2009 | Tomelleri | |
| 2009/0083985 A1 | 4/2009 | Ferrari | |
| 2009/0139105 A1 | 6/2009 | Granger | |
| 2009/0177435 A1 | 7/2009 | Heininen | |
| 2009/0187373 A1 | 7/2009 | Atwell et al. | |
| 2009/0241360 A1 | 10/2009 | Tait et al. | |
| 2009/0249634 A1 | 10/2009 | Pettersson | |
| 2009/0265946 A1 | 10/2009 | Jordil et al. | |
| 2010/0057392 A1 | 3/2010 | York | |
| 2010/0078866 A1 | 4/2010 | Pettersson | |
| 2010/0095542 A1 | 4/2010 | Ferrari | |
| 2010/0208062 A1 | 8/2010 | Pettersson | |
| 2010/0281705 A1 | 11/2010 | Verdi et al. | |
| 2010/0286941 A1 | 11/2010 | Merlot | |
| 2010/0318319 A1 | 12/2010 | Maierhofer | |
| 2010/0325907 A1 | 12/2010 | Tait | |
| 2011/0007326 A1 | 1/2011 | Daxauer et al. | |
| 2011/0013199 A1 | 1/2011 | Siercks et al. | |
| 2011/0107611 A1 | 5/2011 | Desforges et al. | |
| 2011/0107612 A1 | 5/2011 | Ferrari et al. | |
| 2011/0107613 A1 | 5/2011 | Tait | |
| 2011/0107614 A1 | 5/2011 | Champ | |
| 2011/0112786 A1 | 5/2011 | Desforges et al. | |
| 2011/0173828 A1 * | 7/2011 | York et al. | 33/503 |
| 2011/0178755 A1 * | 7/2011 | York | 33/503 |
| 2011/0178762 A1 * | 7/2011 | York | 33/503 |
| 2011/0192043 A1 | 8/2011 | Ferrari | |

FOREIGN PATENT DOCUMENTS

| | | |
|---|---|---|
| DE | 19543763 A1 | 5/1997 |
| DE | 19820307 A1 | 11/1999 |
| DE | 202000000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102005036929 B4 | 6/2010 |
| DE | 102008062763 B3 | 7/2010 |
| EP | 0730210 | 9/1996 |
| EP | 1189124 | 3/2002 |
| EP | 0767357 B1 | 5/2002 |
| EP | 1361414 A1 | 11/2003 |
| EP | 1468791 A1 | 10/2004 |
| EP | 1669713 A1 | 6/2006 |
| EP | 1734425 | 12/2006 |
| EP | 1429109 B1 | 4/2007 |
| EP | 1764579 B1 | 12/2007 |
| EP | 1878543 | 1/2008 |
| EP | 1967930 | 9/2008 |
| EP | 2023077 A1 | 2/2009 |

| | | | |
|---|---|---|---|
| EP | 2060530 A1 | 5/2009 | |
| EP | 2068067 A1 | 6/2009 | |
| EP | 2108917 A1 | 10/2009 | |
| FR | 2935043 A1 | 2/2010 | |
| GB | 894320 | 4/1962 | |
| GB | 2255648 A | 11/1992 | |
| GB | 2341203 A | 3/2000 | |
| GB | 2420241 A | 5/2006 | |
| JP | 7210586 A | 8/1995 | |
| JP | 2004257927 A | 9/2004 | |
| JP | 2006301991 A | 11/2006 | |
| US | 2452033 | 2/2009 | |
| WO | 9208568 A1 | 5/1992 | |
| WO | 9910706 A1 | 3/1999 | |
| WO | WO0014474 | 3/2000 | |
| WO | 0034733 | 6/2000 | |
| WO | 02101323 A2 | 12/2002 | |
| WO | 2004096502 A1 | 11/2004 | |
| WO | 2005072917 | 8/2005 | |
| WO | 2005100908 A1 | 10/2005 | |
| WO | 2006051264 A1 | 5/2006 | |
| WO | 2007002319 A1 | 1/2007 | |
| WO | 2007125081 A1 | 11/2007 | |
| WO | 2007144906 A1 | 12/2007 | |
| WO | 2008027588 | 3/2008 | |
| WO | 2008047171 A1 | 4/2008 | |
| WO | WO2008047171 | 4/2008 | |
| WO | 2008064276 A3 | 5/2008 | |
| WO | 2008075170 A1 | 6/2008 | |
| WO | 2009001165 A1 | 12/2008 | |
| WO | 2009016185 A1 | 2/2009 | |
| WO | 2009130169 A1 | 10/2009 | |
| WO | WO2009127526 A1 | 10/2009 | |
| WO | 2010040742 A1 | 4/2010 | |
| WO | 2010092131 A1 | 8/2010 | |
| WO | 2010108089 A2 | 9/2010 | |
| WO | 2010148525 A1 | 12/2010 | |
| WO | 2011000435 A1 | 1/2011 | |
| WO | 2011000955 A1 | 1/2011 | |
| WO | 2011/057130 A2 | 5/2011 | |

OTHER PUBLICATIONS

Anonymous: So wird's gemacht: Mit T-DSL and Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
International Search Report for International Application No. PCT/2011/020625 mailed Feb. 25, 2011.
International Search Report for International Application No. PCT/US2011/021270 mailed May 2, 2011.
International Search Report for International Application No. PCT2011/021276 filed Jan. 14, 2011.
International Search Report for International Application No. PCT/US2011/021246 mailed Apr. 12, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021272 mailed Apr. 7, 2011.
International Search Report and Written Opinion for International Application No. PCT/US2011/021273 filed Jan. 14, 2011.
International Search Report for International Application No. PCT/US2011/021278 mailed May 25, 2011.
Jasperneite, et al., Enhancements to the Time Synchronization Standard IEEE-1588 for a System of Cascaded Bridges, IEEE, 2004.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Written Opinion of the International Searching Authority for International Application No. PCT/US2011/021246 mailed Apr. 12, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.
Written Opinion of the International Searching Authority for International Application No. PCT/US2011/021272 mailed Apr. 7, 2011.
Written Opinion for International Application No. PCT/US2011/021273 mailed Jan. 14, 2011.
Written Opinion of the International Searching Authority for International Application No. PCT/US2011/021278 mailed May 25, 2011.
Written Opinion of the International Searching Authority for International Application No. PCT/US2011/020625 mailed Feb. 25, 2011.
Written Opinion of the International Searching Authority for Internationl Application No. PCT/US2011/021270 mailed May 2, 2011.
Written Opinion for International Application No. PCT/US2011/021276 filed Jan. 14, 2011.
A. Hart; "Kinematic Coupling Interchangeability" Precision Engineering; vol. 28, No. 1; Jan. 1, 2004 pp. 1-15.
ABB Flexible Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
GoMeasure3D—Your source for all things measurement, Baces 3D 100 Series Portable CMM from GoMeasure3D, [online], [retrieved Nov. 29, 2011], http://www.gomeasure3d.com/baces100.html.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
GHOST 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.
Electro-Optical Information Systems, "The Handy Handheld Digitizer" [online], [retrieved on Nov. 29, 2011], http://vidibotics.com/htm/handy.htm.
International Search Report for International Application No. PCT/US2011/021274 mailed May 6, 2011.
International Search Report for International Application No. PCT/US2011/021248 mailed Sep. 19, 2011.

International Search Report for International Application No. PCT/US2011/021253 mailed Sep. 26, 2011.

International Search Report for International Application No. PCT/US2011/021794 mailed Sep. 23, 2011.

Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.

MicroScan 3D User Guide, RSI GmbH, 3D Systems & Software, Oberursel, Germany, email: info@rsi-gmbh.de, Copyright RSI Roland Seifert Imaging GmbH 2008.

Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.

Written Opinion of the International Searching Authority for International Application No. PCT/US2011/021248 mailed Sep. 19, 2011.

Written Opinion of the International Searching Authority for International Application No. PCT/US2011/021253 mailed Sep. 26, 2011.

Written Opinion of the International Searching Authority for International Application No. PCT/US2011/021794 mailed Sep. 23, 2011.

Written Opinion of the International Searching Authority for International Application No. PCT/US2011/021274 mailed May 6, 2011.

Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.

\* cited by examiner

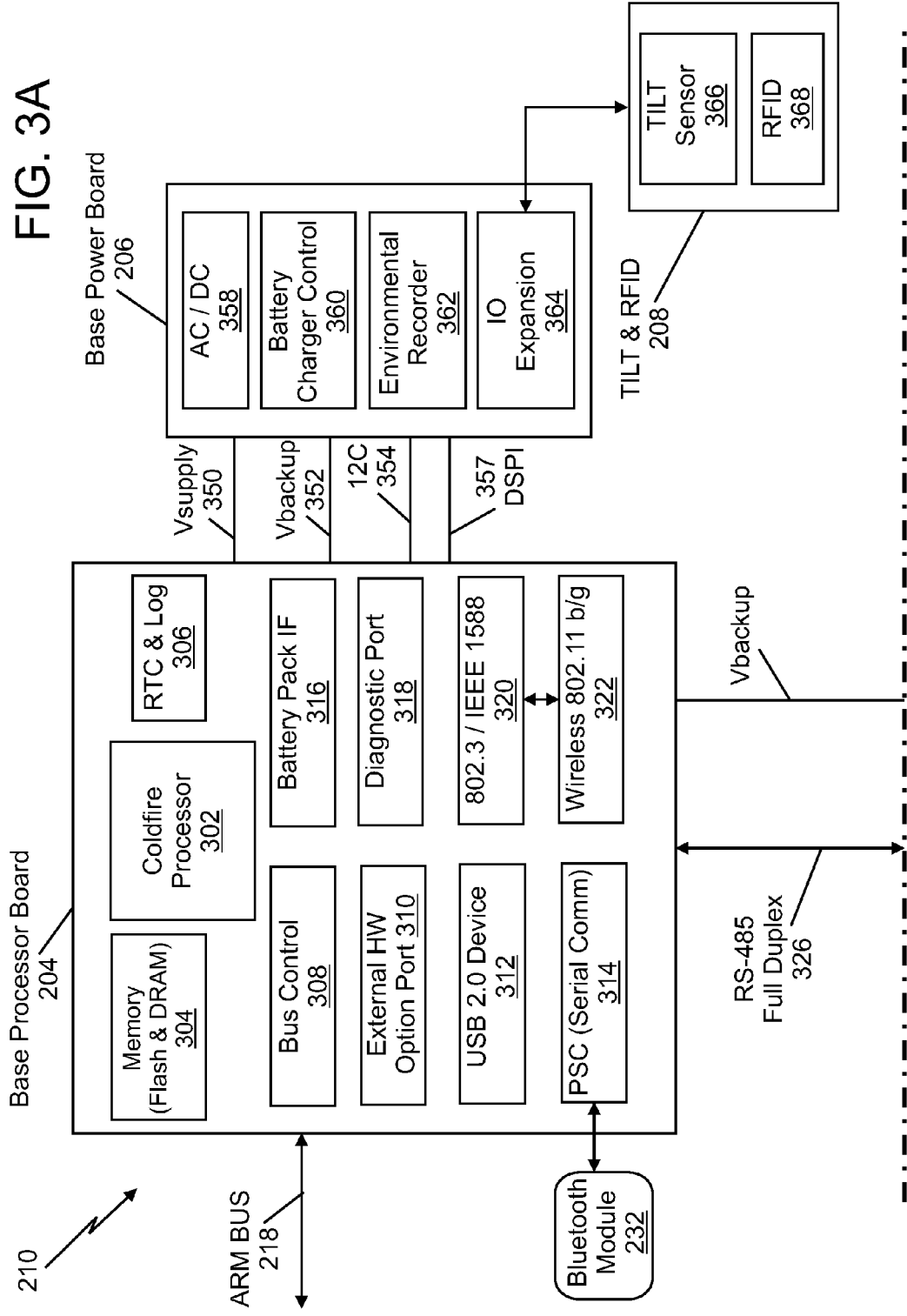

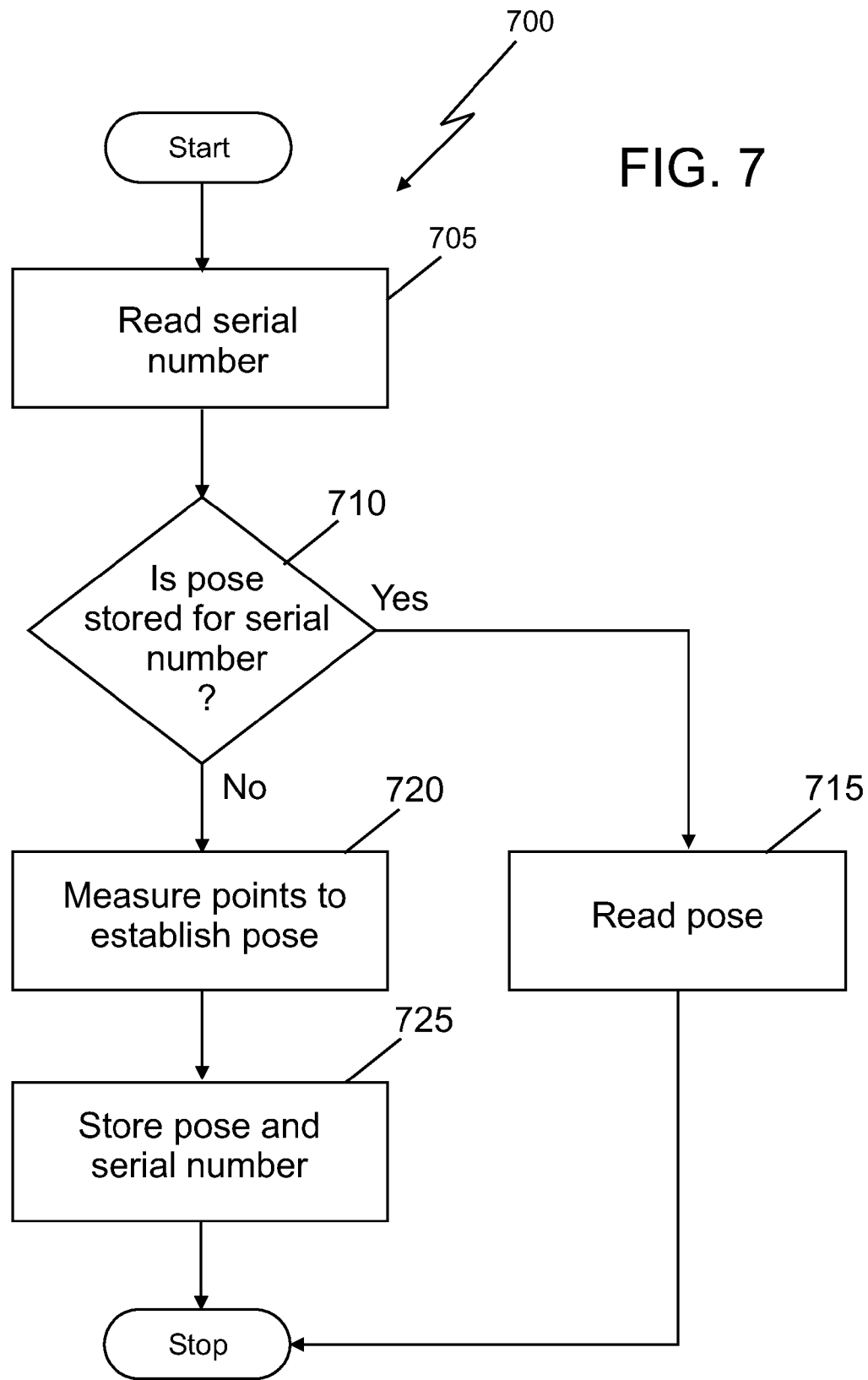

INTELLIGENT REPEATABLE ARM MOUNTING SYSTEM

CROSS-REFERENCE TO RELATED APPLICATIONS

The present application claims the benefit of provisional application No. 61/296,555 filed Jan. 20, 2010, the content of which is hereby incorporated by reference in its entirety.

BACKGROUND

The present disclosure relates to a coordinate measuring machine, and more particularly to a portable articulated arm coordinate measuring machine having a repeatable base mount having an electronic base mount identification system.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

What is needed is an AACMM that can be quickly mounted and dismounted in a repeatable manner.

SUMMARY OF THE INVENTION

Exemplary embodiments include a portable articulated arm coordinate measuring machine including a manually positionable articulated arm portion having opposed first and second ends, the arm portion including a plurality of connected arm segments, each of the arm segments including at least one position transducer for producing position signals, a measurement device attached to the first end of the articulated arm coordinate measuring machine, an electronic circuit for receiving the position signals from the transducers and for providing data corresponding to a position of the measurement device, a base coupled to the second end, an upper mount portion disposed on the base, a lower mount portion fixed to a mounting structure and configured to repeatably connect to the upper mount portion and an electronic identification system configured to send identifier information identifying the lower mount portion to the electronic circuit.

Additional exemplary embodiments include a portable articulated arm coordinate measuring machine including a manually positionable articulated arm portion having opposed first and second ends, the arm portion including a plurality of connected arm segments, each of the arm segments including at least one position transducer for producing position signals, a measurement device attached to the first end of the articulated arm coordinate measuring machine, an electronic circuit for receiving the position signals from the transducers and for providing data corresponding to a position of the measurement device, a base coupled to the second end, an upper mount portion disposed on the base and a lower mount portion fixed to a mounting structure and configured to repeatably connect to the upper mount portion, wherein the upper mount portion and the lower mount portion are components of a curvic coupling or a Hirth coupling.

Further exemplary embodiments include a method of operating a portable articulated arm coordinate measuring machine, with steps including providing a manually positionable articulated arm portion having opposed first and second ends, the arm portion including a plurality of connected arm segments, each of the arm segments including at least one position transducer for producing position signals, a measurement device attached to the first end of the articulated arm coordinate measuring machine, an electronic circuit for receiving the position signals from the transducers and for providing data corresponding to a position of the measurement device, a base coupled to the second end, and an upper mount portion disposed on the base, providing a first lower mount portion fixed to a first mounting structure and configured to repeatably connect to the upper mount portion, connecting the articulated arm coordinate measuring machine to the first lower mount portion and sending to the electronic circuit first identifier data that identifies the first lower mount portion.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

FIG. 4, including

FIG. 6, including FIG. 7 illustrates a flow chart of a method for mounting the AACMM in accordance with exemplary embodiments.

DETAILED DESCRIPTION

Exemplary embodiments include a repeatable base mount having an electronic base mount identification system that associates a base-mount serial number with a prior measurement history for one or more AACMMs. The exemplary base mount allows the AACMM to be removed and repeatably replaced without the need to re-establish the frame of reference of the one or more AACMMs.

Figure 1A:
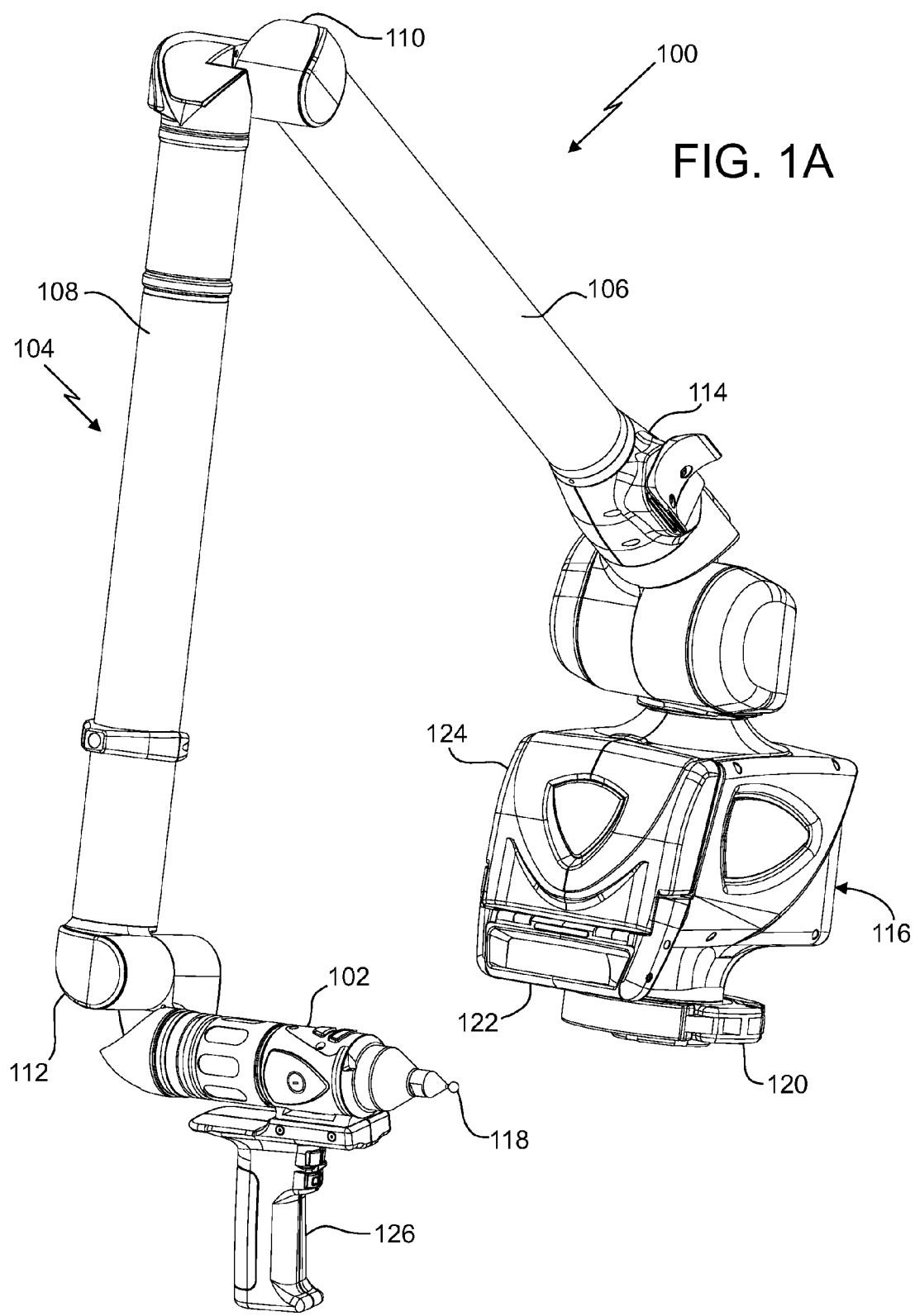
FIGS. 1A and 1B, are perspective views of a portable articulated arm coordinate measuring machine (AACMM) having embodiments of various aspects of the present invention therewithin.
Figure 1B:
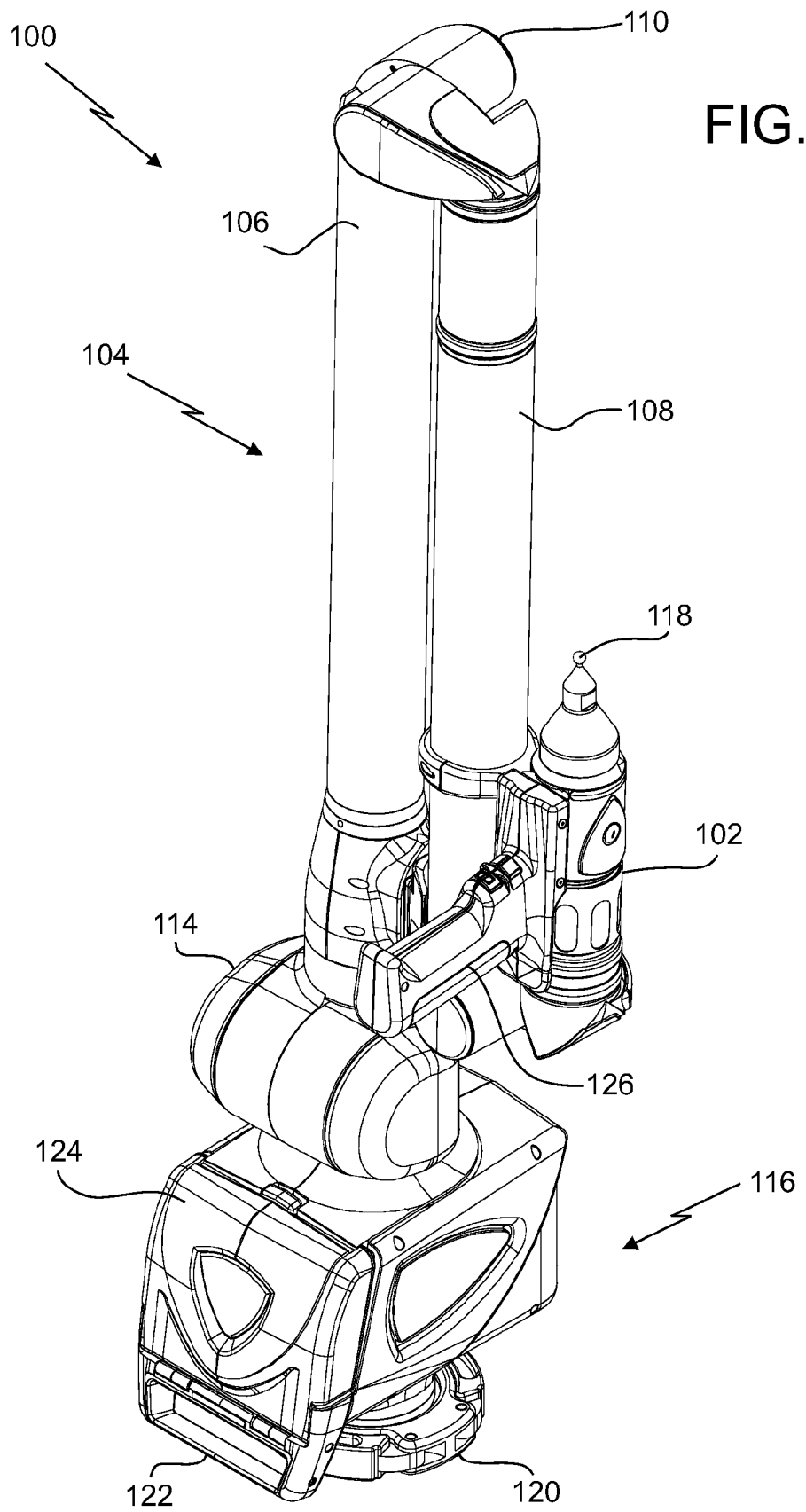

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

Figure 4A:
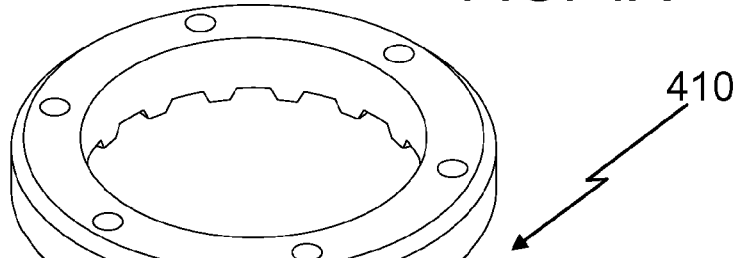
FIGS. 4A and 4B, are perspective views of curvic couplings and Hirth couplings, respectively, that are used as part of a mount for mounting the AACMM of FIG. 1 in a specific location according to embodiments of an aspect of the present invention.
Figure 4B:
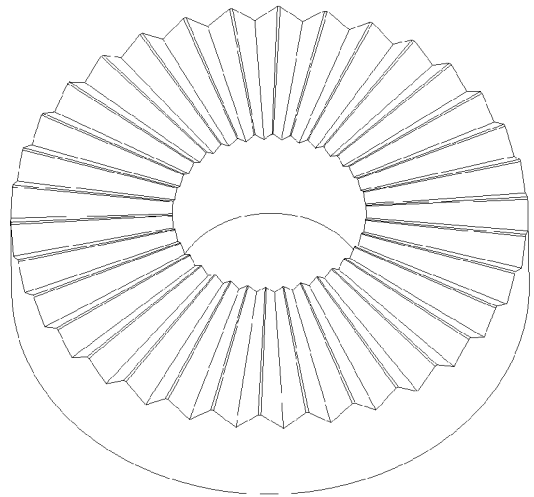
Figure 4B:
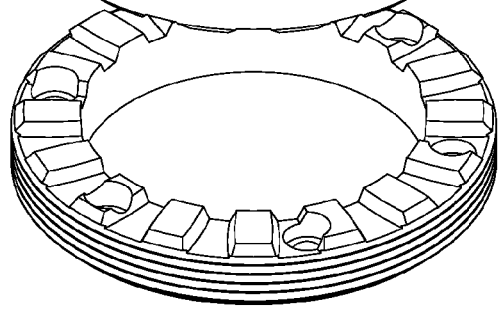
Figure 5:
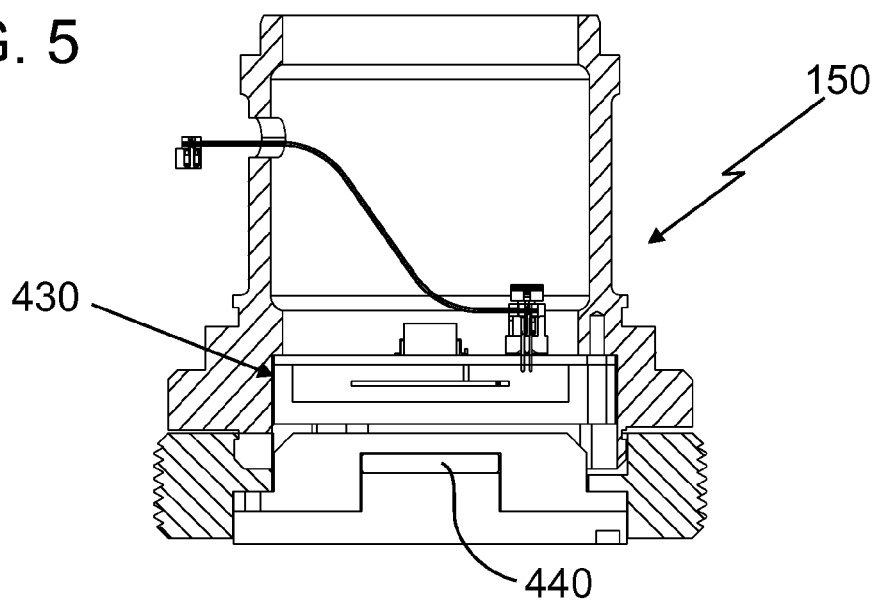
FIG. 5 is a cross section view of a portion of the base of the AACMM of FIG. 1 having the mount embodied therein according to embodiments of an aspect of the present invention.

As described further herein with respect to FIGS. 4-6, the base 116 and mounting device may further include a repeatable base mount 150 incorporated into the base 116 and having an electronic base mount identification system that associates an arm serial number and prior measurement history with the mount 150. The exemplary base mount allows the AACMM 100 to be removed and properly replaced relatively more quickly without the need to establish all the baseline parameters of measurement each time the AACMM 100 is removed from the mount 150 and then subsequently replaced in the mount 150.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2D:
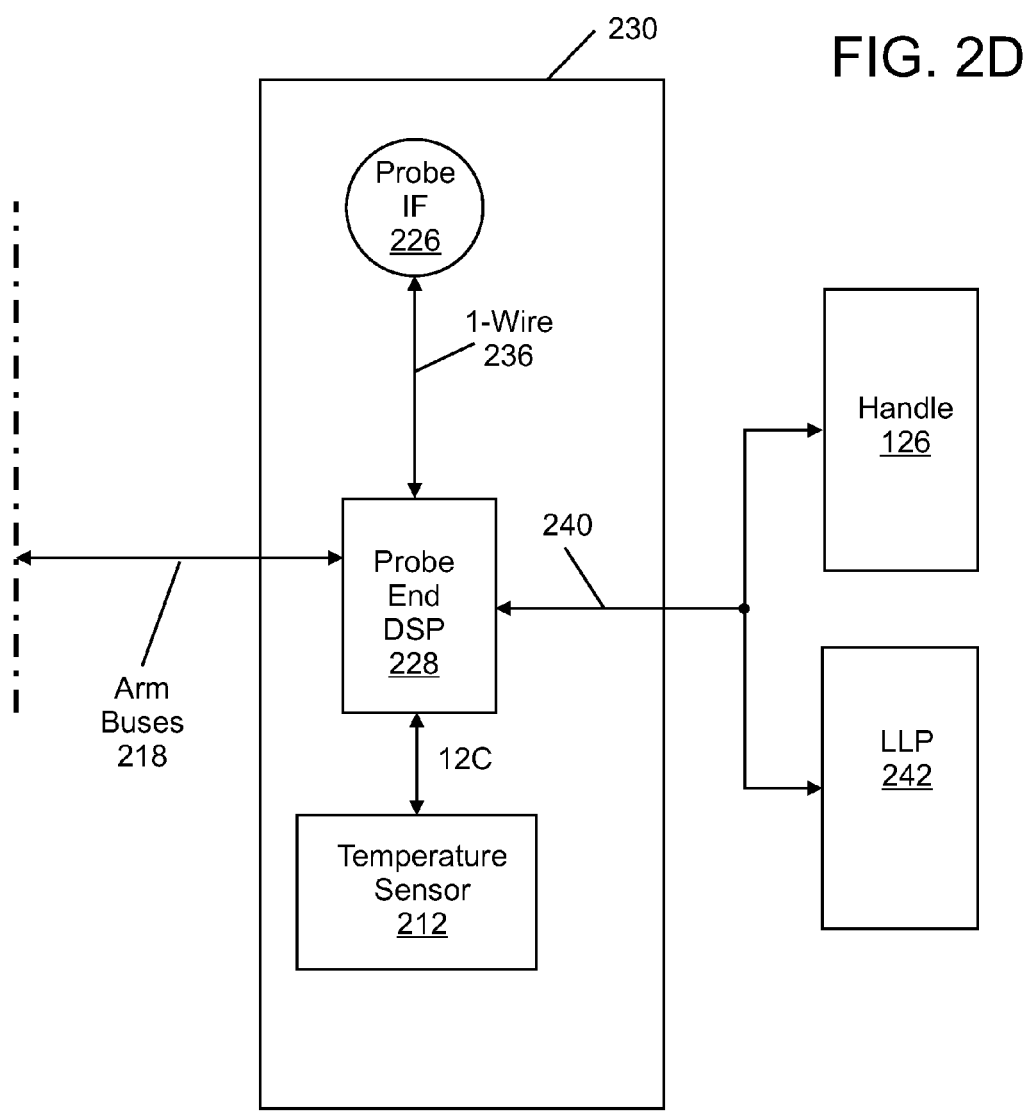
FIG. 2, including FIGS. 2A-2D taken together, is a block diagram of electronics utilized as part of the AACMM of FIG. 1 in accordance with an embodiment.
Figure 2:
Figure 2A:
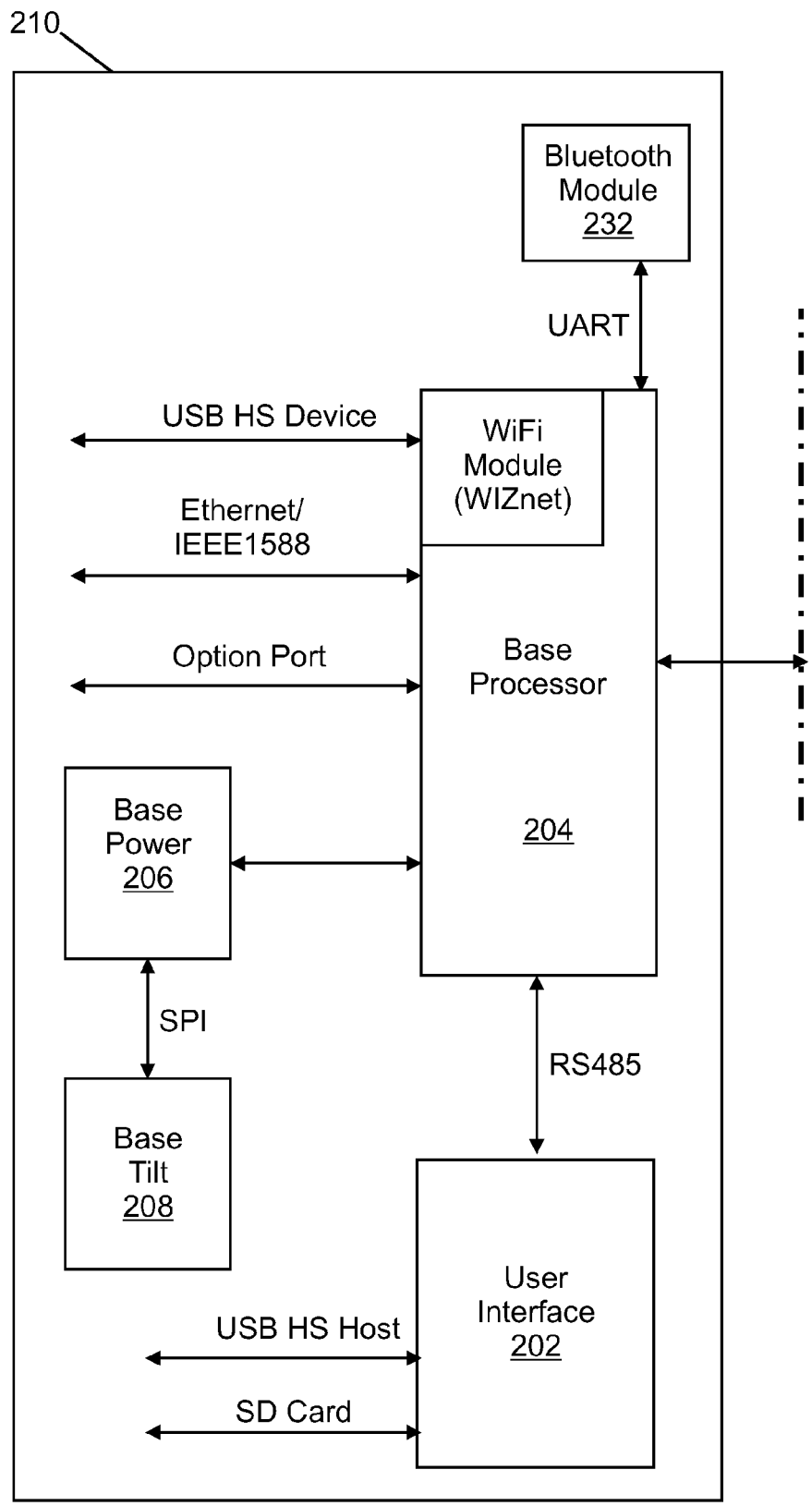
Figure 2B:
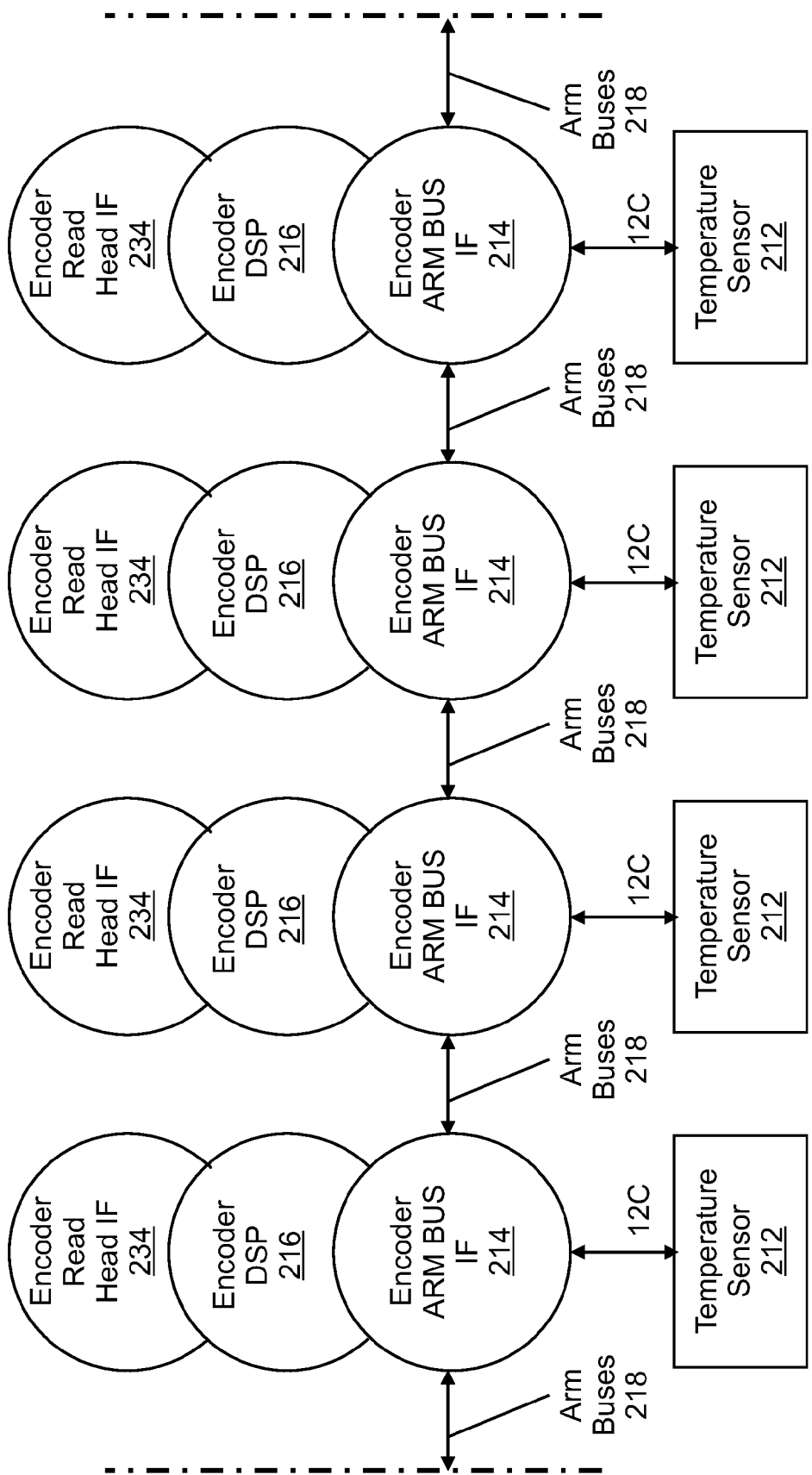
Figure 2C:
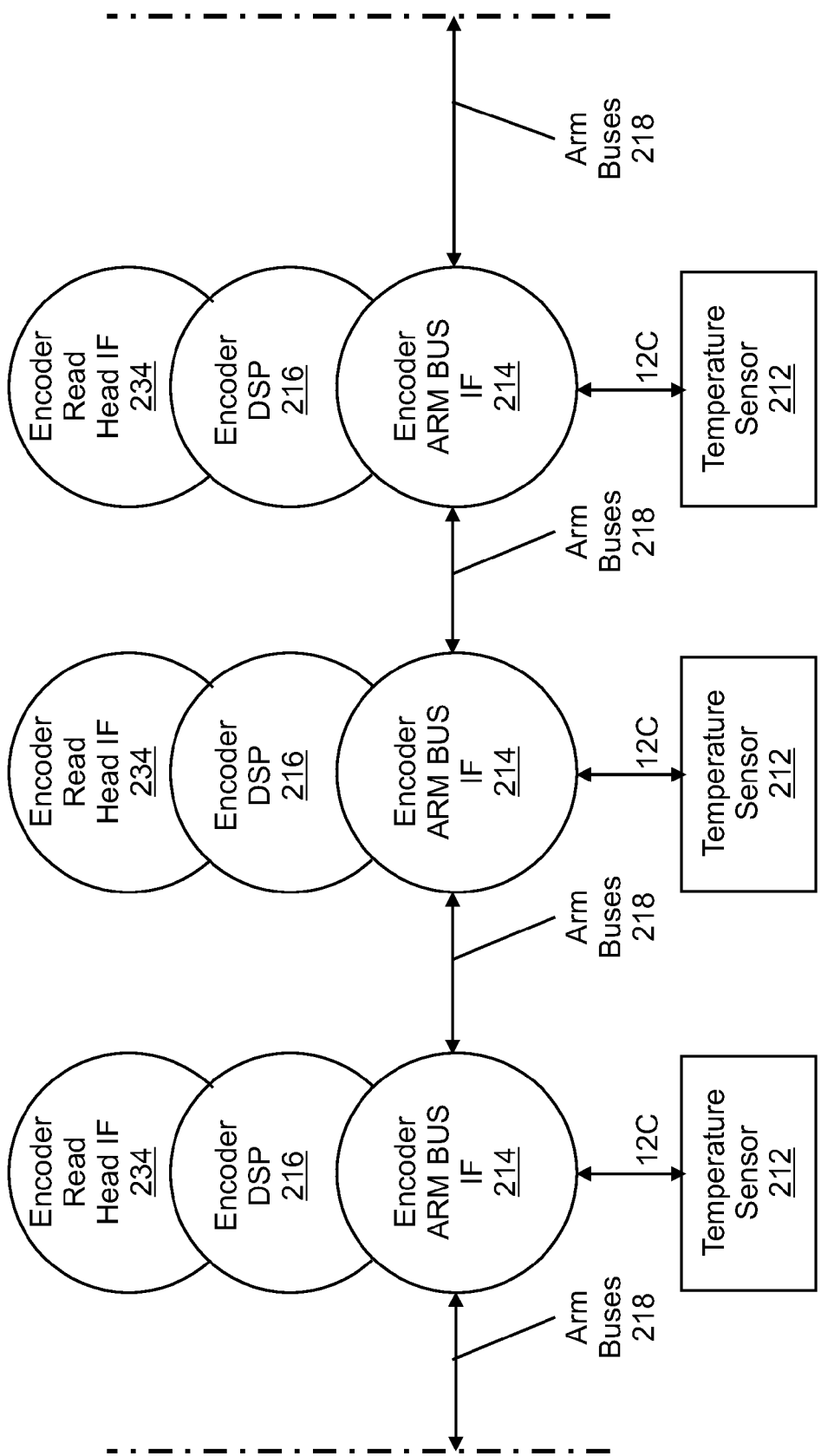

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

Figures 3, 3B:
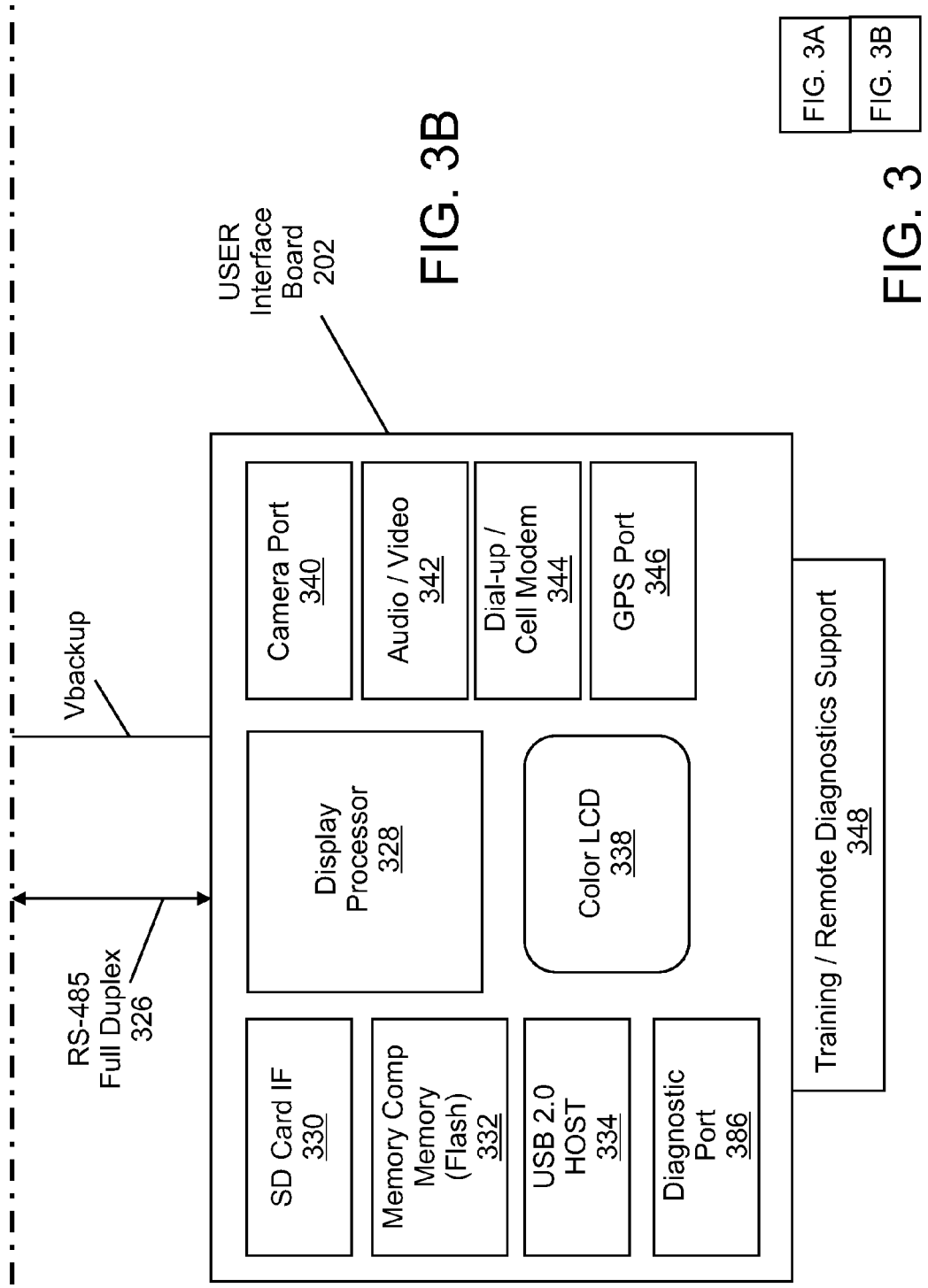
FIG. 3, including FIGS. 3A and 3B taken together, is a block diagram describing detailed features of the electronic data processing system of FIG. 2 in accordance with an embodiment.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 302 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Referring to FIGS. 4-6, another aspect of the improvements to the portable AACMM 100 of embodiments of the present invention relates to a repeatable base mount 150 having an electronic base mount identification system that associates a mount serial number with the and prior measurement history of one or more articulated arm CMMs. The repeatable base mount 150 includes a lower mount portion 402 and an upper mount portion 404. The repeatable base mount 150 can be integral with the base 116, and the mounting device 120 can be used to hold upper mount portion 404 in contact with lower mount portion 402. This may be done by screwing the mounting device 120 downward against the threads of lower mounting portion 402 using a method similar to that illustrated in FIG. 9 of U.S. patent application Ser. No. 13/006,490, filed 14 Jan. 2011, which is hereby incorporated in its entirety by reference.

In certain work scenarios, the operator of the portable AACMM 100 must routinely remove virtually the entire portable AACMM 100 (i.e., the base and arm portions) from a tool, machine, fixture, instrument stand, surface plate, or other work surface to which it was affixed during a machining or assembly operation. The operator must then re-install the portable AACMM 100 to take subsequent measurements. In current portable CMM systems, each time the portable AACMM 100 is re-installed, a relatively long time is required to properly re-establish a coordinate system and re-initiate the measurement session. For example, to establish a frame of reference, the AACMM is used to measure positions on the workpiece or the surroundings in at least three, but usually more, points. If the AACMM is moved to multiple locations, common points are measured by the AACMM in each of the locations to establish a common frame of reference. The user accesses application software to convert the coordinates of the measured points into mathematical transformation matrices that are needed when moving the AACMM from one mounting location to another. Such matrices might be 4×4 matrices that combine the actions of rotation and translation, for example. Methods for obtaining and using transformation matrices are well known to those of ordinary skill in the art and will not be discussed further. Using the transformation matrices, software can be used to find the pose (x, y, z, and three orientation angles) of the AACMM 100 at the new mount position. In general, the time it takes to perform the above-described steps greatly exceeds measurement times. As such, the exemplary embodiments described herein greatly improve efficiency in using the AACMM 100.

The present invention provides a repeatable base mount 150 that allows the AACMM 100 to be removed and repeatably replaced without the need to re-establish the pose of the AACMM 100 whenever the AACMM is moved.

Some embodiments of the current invention use kinematic mounting elements, which may include combinations of balls and rods, for example. Other embodiments of the present invention are based on the principle of elastic averaging (overconstraint) to resist deformation from large forces. Such an embodiment includes a repeatable base mount 150 that can accommodate the relatively extreme forces required to secure the base 116 and arm portion 104 of the AACMM 100 to a mounting ring 400, without deformation. For example, a static force can be an order of magnitude of a weight of the AACMM 100. The torque on the mount of the AACMM 100 can be an order of magnitude of maximum spring forces times a length of the arm segments 106, 108. An embodiment of the repeatable base mount 150 makes use of the principle of elastic averaging (overconstraint). Examples of elastic-averaging mounts 400 shown in FIGS. 4A and 4B include curvic ring couplings 410 (FIGS. 4A, 6A, 6B) and Hirth ring couplings 420 (FIG. 4B), which is also known as V-tooth or Voith couplings. The curvic ring couplings provide a relatively large support surface area and also constrain motion vertically, radially, and concentrically. Implementation of the curvic ring couplings 410 and the Hirth ring couplings 420 overcome the problems of the relatively extreme forces as described herein. As known in the art, curvic ring couplings 410 have precision face splines with curved radial teeth of contact depth. Curvic ring couplings 410 are implemented for joining two or more members to form a single operating unit. Also as known in the art, Hirth ring couplings 420 include radial grooves milled or ground into an end face of a cylindrical feature of a part. Grooves are made one by one into the part tilted by a bottom angle of the grooves, and rotated from groove to groove until serration is complete. Hirth ring couplings 420 are implemented to connect two pieces of a part together and are characterized by teeth that mesh together on end faces of each part half.

In addition to the features that enable the repeatability of the couplings 400, the base mounting system 150 also includes a key or pin to ensure a single mounting orientation. Each coupling 400 has a lower mount portion 402 and an upper mount portion 404. The lower mount portion 402 is incorporated into a mounting ring, which can be attached using conventional means to a tool, machine, fixture, instrument stand, surface plate, or other work surface. The mounting ring may, for example, be integrated into mounting device 420. The lower mount portion 402 may be assigned a unique serial number that can be transmitted to the AACMM 100 when installed on the mounting ring. This communication can be achieved wirelessly, magnetically, or via electrical connectors. In an embodiment, an encapsulated RF identification (RFID) tag 440 may be installed in the center of the mount assembly. In an embodiment, the serial number of the RF identification tag 440 is read by a transceiver 430.

Figure 6A:
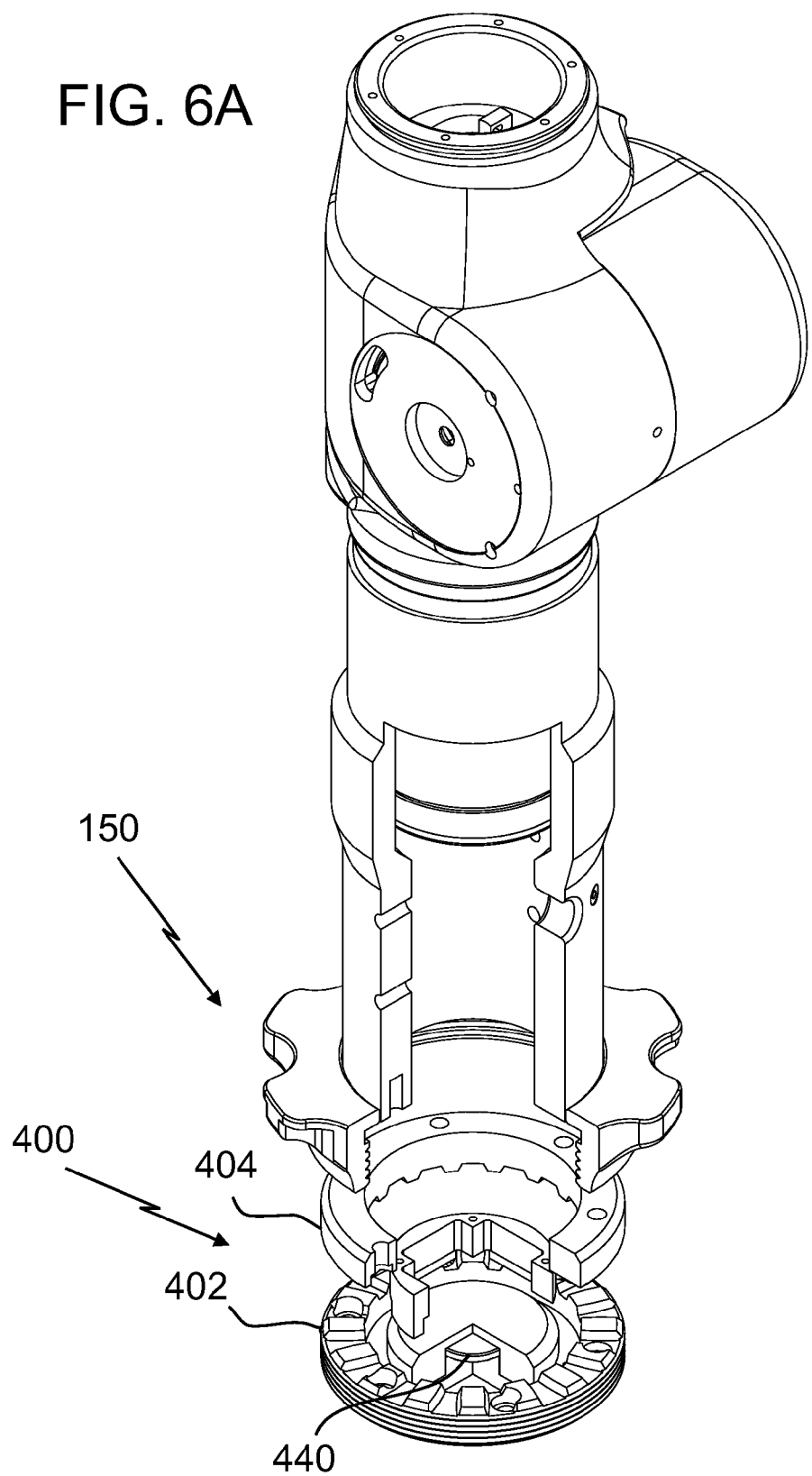
FIGS. 6A and 6B, are perspective views, partially cutaway, of the mount in unassembled and assembled positions, respectively, according to embodiments of an aspect of the present invention.
Figure 6B:
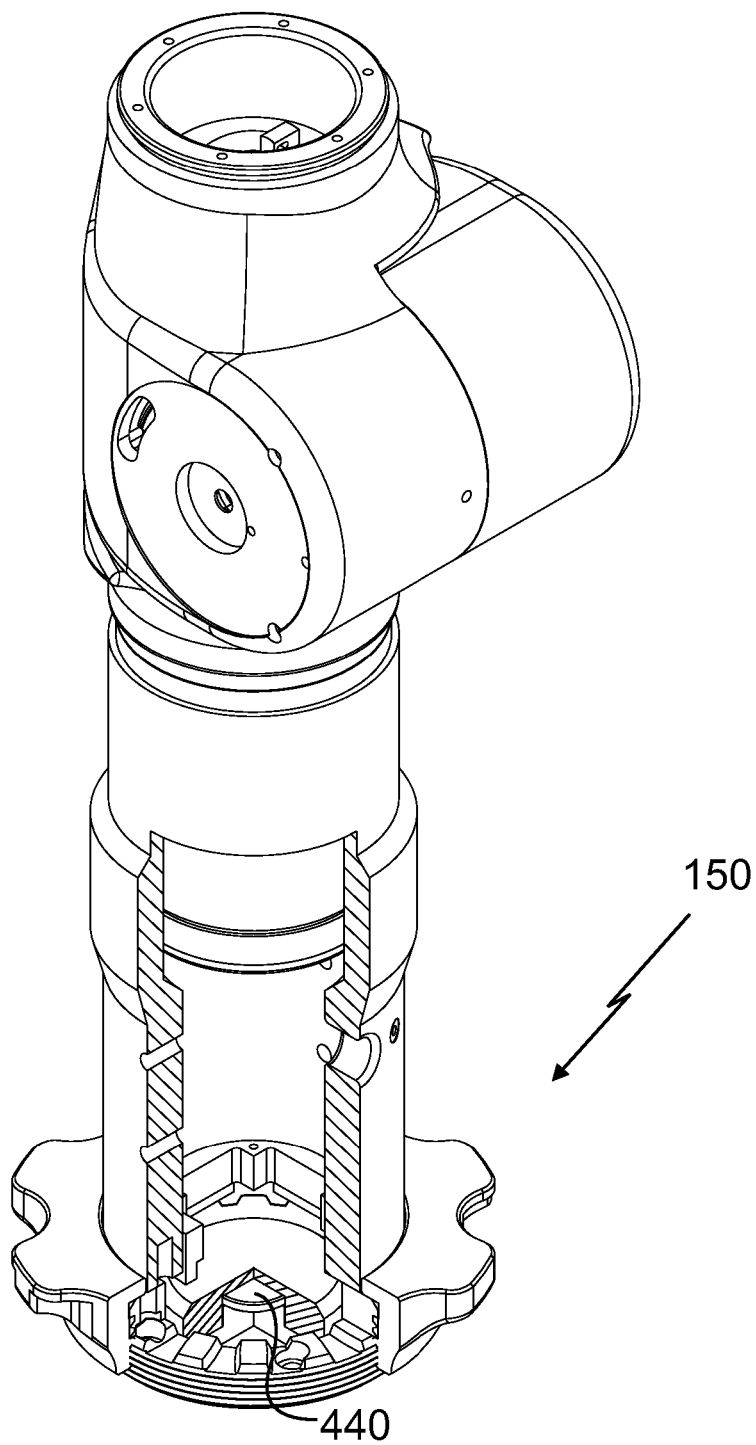

An alternative design that provides a relatively more rigid coupling is a center drawn (e.g., bolt) attachment instead of a threaded ring (such as the threaded ring shown in lower mount portion 402 of FIG. 6A). Such a design may involve moving the RFID tag off the center of the lower mount portion 402 and the transceiver 430 off the center of the base 116. In their places, a bolt is threaded between the lower mount portion 402 and the base 116 to hold the lower mount portion 402 and upper mount portion 404 securely together. Compared to a threaded design, this alternative design may provide a relatively more uniform edge loading of the ring, thereby providing a relatively more rigid mount.

The upper mount portion 404 is attached to the base 116 of the AACMM 100. The base 116 includes a means to read the serial number of the mount. In an embodiment, an RF transceiver 430 may be mounted inside the base 116 of the AACMM 100, and an RF transparent window permits RF energy to pass from the base 116 to the RFID tag 440. Shielding may be provided around the transceiver 430 and RFID tag 440 to minimize RF radiation emission from the transceiver 430 and susceptibility to RF radiation by the transceiver 430.

In embodiments of the present invention, the AACMM 100 contains hardware and software to allow storage of the pose (x, y, z, and three orientation angles) of the AACMM 100 within the global frame of reference for each position of a lower mounting portion 402. Consequently, installation of the AACMM 100 on the mount is relatively fast. That is, the previous set-up information (i.e., pose) for that AACMM 100 is not lost and may be reused to quickly re-establish the baseline coordinate system for that particular AACMM 100. Multiple mount and AACMM 100 combinations can be created and stored. Multiple lower mount portions 402 can be secured within a work area and an AACMM 100 moved from one lower mount portion 402 to another. Multiple AACMMs 100 and multiple lower mount portions 402 may store unique set-up information allowing for relatively fast, flexible equipment changes.

FIG. 7 illustrates a flow chart of a method 700 for mounting the AACMM 100 in accordance with exemplary embodiments. At step 705, the transceiver 430 of the AACMM 100 reads the serial number of the RFID tag 440 attached to the lower mount portion 402. At step 710, the electronic data processing system 210 determines whether the pose of the AACMM 100 is known for the serial number read in step 705. If the serial number is known, then in step 715 the electronic data processing system 210 reads from memory 304 the six numbers (three positions and three angles) associated with the pose of the AACMM 100. If the serial number is not known, then in step 720 the operator uses the AACMM 100 to measure a collection of points that are used by software to establish the pose of the AACMM 100 within a desired (e.g., global) frame of reference. Generally at least three points need to be measured. The points may be referenced to features from a CAD model or to features on a workpiece. In some cases, the same points may be measured by other AACMMs to place the AACMMs in a common frame of reference. In step 725, the electronic data processing system 210 stores in the memory 304 the pose of the AACMM 100 and the serial number from the RFID tag 440 of the lower mount portion 402.

The method described with reference to FIG. 7 assumes that the lower mount portion 402 has not been moved since the pose of the AACMM 100 was last determined. The possibility that the lower mount portion 402 has been moved can be accounted for in the application software, if desired.

In embodiments hereinabove, an electronic identification system, which may include an RF identification tag and a transceiver, for example, is used to automatically send information to the electronic data processing system 210 to identify the particular lower mount portion 402. For example, the lower mount portion 402 may be identified by a serial number. In another embodiment, the operator may take an action to identify the lower base portion 402. For example, the application software may provide a user interface that enables the operator to identify the lower mount portion 402 whenever AACMM 100 is moved. By this means the operator can identify a particular lower mount portion 402 even if an electronic identification system is not available. In this case, the AACMM 100 can be moved among lower base portions 402 and quickly identified by the user in software. The software will then have access to the required transformation matrices, thereby eliminating the time-consuming measurement steps that would otherwise be required.

Technical effects and benefits include the ability to store and recall the pose for an AACMM 100 when placed on a lower mount portion 402, thereby saving setup time when moving an AACMM from place to place.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measuring machine (AACMM), comprising:
    a manually positionable articulated arm portion having opposed first and second ends, the arm portion including a plurality of connected arm segments, each of the arm segments including at least one position transducer for producing position signals;
    a measurement device attached to the first end of the AACMM;
    an electronic circuit for receiving the position signals from the transducers and for providing data corresponding to a position of the measurement device;
    a base coupled to the second end;
    an upper mount portion disposed on the base;
    a lower mount portion fixed to a mounting structure and configured to repeatably connect to the upper mount portion; and
    an electronic identification system configured to send identifier information identifying the lower mount portion to the electronic circuit.

2. The AACMM of claim 1, wherein the upper mount portion and the lower mount portion are components of a curvic coupling or a Hirth coupling.

3. The AACMM of claim 1, wherein the electronic identification system includes an RF identification tag.

4. The AACMM of claim 1, wherein the electronic identification system includes a transceiver.

5. A portable articulated arm coordinate measuring machine (AACMM), comprising:
    a manually positionable articulated arm portion having opposed first and second ends, the arm portion including a plurality of connected arm segments, each of the arm segments including at least one position transducer for producing position signals;
    a measurement device attached to the first end of the AACMM;
    an electronic circuit for receiving the position signals from the transducers and for providing data corresponding to a position of the measurement device;
    a base coupled to the second end;
    an upper mount portion disposed on the base; and
    a lower mount portion fixed to a mounting structure and configured to repeatably connect to the upper mount portion, wherein the upper mount portion and the lower mount portion are components of a curvic coupling or a Hirth coupling.

6. The AACMM of claim 5, further comprising an electronic identification system configured to send identifier information identifying the lower mount portion to the electronic circuit.

7. The AACMM of claim 6, wherein the electronic identification system includes an RF identification tag.

8. The AACMM of claim 6, wherein the electronic identification system includes a transceiver.

9. A method of operating a portable articulated arm coordinate measuring machine (AACMM), with steps comprising:
    providing a manually positionable articulated arm portion having opposed first and second ends, the arm portion including a plurality of connected arm segments, each of the arm segments including at least one position transducer for producing position signals, a measurement device attached to the first end of the AACMM, an electronic circuit for receiving the position signals from the transducers and for providing data corresponding to a position of the measurement device, a base coupled to the second end, and an upper mount portion disposed on the base;

providing a first lower mount portion fixed to a first mounting structure and configured to repeatably connect to the upper mount portion;

connecting the articulated arm coordinate measuring machine to the first lower mount portion; and sending to the electronic circuit first identifier data that identifies the first lower mount portion.

10. The method of claim 9, wherein the first identifier data is sent to the electronic circuit by an electronic identification system.

11. The method of claim 10, wherein the electronic identification system includes a transceiver.

12. The method of claim 11, wherein the electronic identification system includes an RF identification tag.

13. The method of claim 9, wherein the first identifier data is sent to the electronic circuit based at least in part on an operator action.

14. The method of claim 9, further comprising the step of calculating a first three-dimensional coordinate value based at least in part on the position signals and the provided data corresponding to a position of the measurement device.

15. The method of claim 14, further comprising the step of associating the first identifier data with the first three-dimensional coordinate value.

16. The method of claim 15, further comprising the steps of:

providing a second lower mount portion fixed to a second mounting structure and configured to repeatably connect to the upper mount portion;

connecting the articulated arm coordinate measuring machine to the second lower mount portion; and sending to the electronic circuit second identifier data that identifies the second lower mount portion.

17. The method of claim 16, further comprising the step of transforming the first three-dimensional coordinate and the second three-dimensional coordinate into a common frame of reference.

18. The method of claim 9, wherein the upper mount portion and the lower mount portion are components of a curvic coupling or a Hirth coupling.

19. A portable articulated arm coordinate measuring machine (AACMM), comprising:

a manually positionable articulated arm portion having opposed first and second ends, the arm portion including a plurality of connected arm segments, each of the arm segments including at least one position transducer for producing position signals;

a measurement device attached to the first end of the AACMM;

an electronic circuit;

a base coupled to the second end;

an upper mount portion disposed on the base;

a lower mount portion fixed to a mounting structure and configured to repeatably connect to the upper mount portion in a single mounting orientation; and an electronic identification system configured to send identifier information identifying the lower mount portion to the electronic circuit, wherein the electronic circuit is configured to receive the position signals from the transducers, configured to receive the identifier information from the electronic identification system, and configured to calculate a position of the measurement device.

20. The AACMM of claim 19, wherein the upper mount portion and the lower mount portion are components of a curvic coupling or a Hirth coupling.

21. The AACMM of claim 19, wherein the electronic identification system includes an RF identification tag.

22. The AACMM of claim 19, wherein the electronic identification system includes a transceiver.

23. The AACMM of claim 19, wherein the mounting structure is configured to screw against threads of the lower mount portion to hold the lower mount portion in contact with the upper mount portion.

24. The AACMM of claim 19, wherein the electronic identification system determines a pose for the AACMM within a global frame of reference based at least in part on the received identifier information and determines a position of the measurement device within the global frame of reference.

25. The AACMM of claim 24, wherein the pose includes x, y, z coordinates, and three orientation angles of the lower mount portion in the global frame of reference.

26. The AACMM of claim 19, wherein the upper mount portion and the lower mount portion include kinematic mounting elements.

27. The AACMM of claim 19, wherein the upper mount portion and the lower mount portion interact via elastic averaging.

28. The AACMM of claim 19, wherein the single mounting orientation is maintained by at least one of a key and a pin.

29. The AACMM of claim 19, wherein the upper mount portion and the lower mount portion are held in contact by a center drawn attachment.

30. The AACMM of claim 19, wherein the electronic circuit is configured to store at least one pose.

31. The AACMM of claim 19, wherein the AACMM is configured to be moved to a plurality of lower mount portions and the electronic circuit is configured to store a plurality of poses for the plurality of lower mount portions.

32. The AACMM of claim 31, wherein each pose of the plurality of poses is in a global frame of reference.

33. The AACMM of claim 19, wherein the electronic circuit includes a processor.

34. The AACMM of claim 19, wherein the electronic circuit includes a memory device.

35. The AACMM of claim 19, wherein the at least one position transducer is an angular encoder.

36. The AACMM of claim 19, wherein at least a portion of the electronic identification system is attached to the lower mount portion.

37. The AACMM of claim 19, wherein at least a portion of the electronic identification system is attached to the upper mount portion.

38. A method of operating a portable articulated arm coordinate measuring machine (AACMM), with steps comprising:

providing a manually positionable articulated arm portion having opposed first and second ends, the arm portion including a plurality of connected arm segments, each of the arm segments including at least one position transducer for producing position signals, providing a measurement device attached to the first end of the AACMM, an electronic circuit, a base coupled to the second end, and an upper mount portion disposed on the base;

providing a first lower mount portion fixed to a first mounting structure and configured to repeatably connect to the upper mount portion in a single mounting orientation;

providing an electronic identification system configured to send identifier information identifying the lower mount portion to the electronic circuit;

connecting the upper mount portion of the articulated arm coordinate measuring machine to the first lower mount portion in a single mounting orientation;

sending by the electronic identification system first identifier data that identifies the first lower mount portion to the electronic circuit;

receiving the position signals from the transducers and the first identifier data by the electronic circuit; and providing data corresponding to the position of the measurement device based at least in part on the position signals and the first identifier data.

39. The method of claim 38, wherein the first identifier data is sent to the electronic circuit by the electronic identification system.

40. The method of claim 39, wherein the electronic identification system includes a transceiver.

41. The method of claim 40, wherein the electronic identification system includes an RF identification tag.

42. The method of claim 38, wherein the first identifier data is sent to the electronic circuit based at least in part on an operator action.

43. The method of claim 38, further comprising the step of calculating a first three-dimensional coordinate value based at least in part on the position signals and the provided data corresponding to a position of the measurement device.

44. The method of claim 43, further comprising the step of associating the first identifier data with the first three-dimensional coordinate value.

45. The method of claim 44, further comprising the steps of:

providing a second lower mount portion fixed to a second mounting structure and configured to repeatably connect to the upper mount portion in a single mounting orientation;

connecting the AACMM to the second lower mount portion; and sending to the electronic circuit second identifier data that identifies the second lower mount portion.

46. The method of claim 45, further comprising the step of transforming the first three-dimensional coordinate and the second three-dimensional coordinate into a common frame of reference.

47. The method of claim 38, wherein the upper mount portion and the lower mount portion are components of a curvic coupling or a Hirth coupling.

* * * * *